United States Patent [19]

Doi et al.

[11] Patent Number: 5,290,898
[45] Date of Patent: Mar. 1, 1994

[54] CONDENSED RESIN DISPERSION AND PROCESS FOR ITS PRODUCTION

[75] Inventors: Takao Doi, Yokohama; Noriko Itaya, Tokyo; Masami Yamashita, Yokohama, all of Japan

[73] Assignee: Asahi Glass Company Ltd., Tokyo, Japan

[21] Appl. No.: 961,059

[22] Filed: Oct. 14, 1992

Related U.S. Application Data

[63] Continuation of Ser. No. 814,032, Dec. 24, 1991, abandoned, which is a continuation of Ser. No. 518,427, May 3, 1990, abandoned.

[30] Foreign Application Priority Data

| May 10, 1989 | [JP] | Japan | 1-114978 |
| Mar. 26, 1990 | [JP] | Japan | 2-73269 |
| Mar. 26, 1990 | [JP] | Japan | 2-73270 |

[51] Int. Cl.$^5$ .......... C08J 9/30; C08K 5/06; C08G 12/32; C08L 61/28
[52] U.S. Cl. .......... 528/76; 521/67; 524/377; 525/456; 525/509
[58] Field of Search .......... 525/456, 509; 524/377; 528/76; 521/67

[56] References Cited

U.S. PATENT DOCUMENTS

| 4,046,729 | 9/1977 | Scriven et al. | 525/456 |
| 4,260,530 | 4/1981 | Reischl et al. | 525/456 |
| 4,301,262 | 11/1981 | Wagner et al. | 525/456 |

FOREIGN PATENT DOCUMENTS

| 0075161 | 6/1976 | Australia | 525/509 |
| 0351080 | 1/1990 | European Pat. Off. . | |
| 90108390 | 10/1991 | European Pat. Off. . | |
| 1506341 | 4/1978 | United Kingdom . | |

Primary Examiner—James J. Seidleck
Assistant Examiner—Thomas Hamilton, III
Attorney, Agent, or Firm—Oblon, Spivak, McClelland, Maier & Neustadt

[57] ABSTRACT

A condensed resin dispersion having fine particles of a condensed resin dispersed stably in a polyether polyol (c), the condensed resin being a reaction product of an aldehyde and a compound condensable with the aldehyde, or of their precondensate, wherein the fine particles of the condensed resin are fine condensed resin particles formed by the reaction and precipitation conducted in an isocyanate-modified polyether (b) obtained by reacting an organic polyisocyanate to a polyether (a) having at least one active hydrogen group reactive with an isocyanate group, or to such a polyether (a) and a low molecular weight active hydrogen-containing compound having at least one active hydrogen group, and having substantially no free isocyanate group.

5 Claims, No Drawings

CONDENSED RESIN DISPERSION AND PROCESS FOR ITS PRODUCTION

This application is a Continuation of application Ser. No. 07/814,032, filed on Dec. 24, 1991, now abandoned, which is a Continuation of application Ser. No. 07/518,427, filed on May 3, 1990, now abandoned.

The present invention relates to a condensed resin dispersion suitable for use for the production of polyurethane and a process for its production.

As a polyol useful as the starting material for polyurethane, so-called polymer polyol or graft polyol has been known. This is a polymer polyol having an addition polymerization type polymer grafted to the molecular chain of a polyol such as polyether polyol or unsaturated polyol, or a polymer polyol having an addition polymer or other polymer simply dispersed in a polyol. As a method for producing a polymer polyol of this type, it is known to polymerize a vinyl monomer such as acrylonitrile or styrene in a liquid polyol, to simply disperse a preliminarily prepared polymer such as a vinyl polymer in a polyol, or to graft such a dispersed polymer to a polyol. In most cases, the polymers in such conventional polymer polyols are vinyl polymers. Exceptionally, however, a polymer polyol having a linear polyester dispersed therein, is also known.

Further, it is known to use an amino resin precondensate as a starting material for polyurethane. The amino resin precondesate has hydroxyl groups reactive with isocyanate groups, such as methylol groups. Therefore, by reacting such an amino resin precondensate with a polyisocyanate compound, a polyurethane foam is obtainable (U.S. Pat. No. 4,130,697). It is also known to use a mixture comprising an etherified amino resin precondensate having a part of methylol groups of the amino resin precondensate etherified and a usual polyol useful as the starting material of polyurethane, as a starting material for the production of polyurethane foam (Japanese Unexamined Patent Publication No. 153000/1977). A method for producing such an amino resin precondensate by condensation in a polyol, has also already been proposed (Japanese Unexamined Patent Publication No. 101848/1979).

The above-mentioned conventional materials for polyurethane have various problems. Firstly, the so-called polymer polyol is suitable, for example, as a starting material for highly elastic polyurethane foam, but it has an unsolved problem that it is not only ineffective for flame retardancy of polyurethane, but tends to deteriorate the flame retardancy.

On the other hand, a polyol containing an amino resin precondensate is hardly capable of providing high elastic effects to a polyurethane foam characteristic of the polymer polyol, since the amino resin precondensate is a polyol having a relatively low molecular weight and does not have a high molecular weight like the polymer in the above-mentioned polymer polyol. Accordingly, its application is limited for a hard polyurethane foam. Therefore, this polyol is hardly regarded as a kind of polymer polyols.

Whereas, it is also known to impart flame retardancy to polyurethane by incorporating a cross-linked high molecular weight condensed resin powder to polyurethane as a filler. However, it is difficult to uniformly disperse such a filler in a polyol. Namely, it is inferior in the dispersion stability as compared with a so-called polymer polyol, and such is disadvantageous from the viewpoint of the production of polyurethane.

Further, U.S. Pat. Nos. 4,225,481, 4,282,135, 4,246,160 and 4,301,262 propose a method for producing a dispersion of an aminoplast condensate by condensing a substance capable of forming an aminoplast in a polyhydroxy compound. However, even by this method, a completely stable dispersion of resin particles is hardly obtainable, and the resin particles thereby obtained are fine particles only.

U.S. Pat. No. 4,122,049 discloses a method of forming sedimentary particles and incorporating them to a polyol, etc. However, in this case, the particle size is large, whereby the particles are likely to settle in the polyol. To improve the dispersion stability of such condensed type resin particles, it is necessary to reduce the particle size. On the other hand, if the particle size is reduced, the particles tend to hardly settle, and there has been a problem that the separation by filtration tends to be difficult.

It is an object of the present invention to solve the above-mentioned various problems inherent to the conventional polymer-containing polyols as starting materials for polyurethane and to provide a novel process for preparing a condensed resin dispersion having excellent dispersion stability, which is useful as a starting material for producing flame retardant polyurethane.

The present inventors have conducted various studies for a condensed resin dispersion having excellent dispersion stability and low viscosity. As a result, they have found that the dispersion stability can be remarkably improved either by precipitating fine particles of the condensed resin in the presence of an isocyanate-modified polyether, followed by an addition of a polyether polyol, or by precipitating such particles in a mixture of an isocyanate-modified polyether and a polyether polyol. This isocyanate-modified polyether is the one obtainable by reacting a polyether having an active hydrogen group such as a polyether polyol with an organic polyisocyanate. The isocyanate groups of this organic polyisocyanate may partially be blocked, or excess isocyanate groups may subsequently be blocked with a blocking agent. Such an isocyanate-modified polyether has substantially no free isocyanate group, and it may or may not have functional groups such as hydroxyl groups, amino groups or blocked isocyanate groups.

The present invention provides a condensed resin dispersion having fine particles of a condensed resin dispersed stably in a polyether polyol (c), said condensed resin being a reaction product of an aldehyde and a compound condensable with the aldehyde, or of their precondensate, wherein the fine particles of the condensed resin are fine condensed resin particles formed by the reaction and precipitation conducted in an isocyanate-modified polyether (b) obtained by reacting an organic polyisocyanate to a polyether (a) having at least one active hydrogen group reactive with an isocyanate group, or to such a polyether (a) and a low molecular weight active hydrogen-containing compound having at least one active hydrogen group, and having substantially no free isocyanate group.

The present invention also provides a process for producing a condensed resin dispersion, which comprises precipitating fine condensed resin particles by reacting an aldehyde and a compound condensable with the aldehyde, or their precondensate, in an isocyanate-modified polyether (b) obtained by reacting an organic polyisocyanate to a polyether (a) having at least one active hydrogen group reactive with an isocyanate group, or to such a polyether (a) and a low molecular weight active hydrogen-containing compound having at least one active hydrogen group and having substantially no free isocyanate group, or in a mixture of such an isocyanate-modified polyether (b) with water or a solvent, then adding a polyether polyol (c), and in the case where water or a solvent exists, removing the water or the solvent before or after the addition of the polyether polyol (c).

Further, the present invention provides a process for producing a condensed resin dispersion, which comprises precipitating fine condensed resin particles by reacting an aldehyde and a compound condensable with the aldehyde, or their precondensate, in a mixture of a polyether polyol (c) and an isocyanate-modified polyether (b) obtained by reacting an organic polyisocyanate to a polyether (a) having at least one active hydrogen group, or to such a polyether (a) and a low molecular weight active hydrogen-containing compound having at least one active hydrogen group, and having substantially no free isocyanate group.

Now, the present invention will be described in detail with reference to the preferred embodiments.

The polyether polyol (c) as the base polyol for the condensed resin dispersion of the present invention, includes, for example, a polyether polyol obtained by adding an alkylene oxide to an active hydrogen-containing compound such as a polyhydroxy compound such as a polyhydric alcohol or a polyhydric phenol, an amine or phosphoric acid, and a polyether polyol of a cyclic ether polymer.

Specifically, it includes polyether polyols obtained by adding ethylene oxide, propylene oxide, butylene oxide, epichlorohydrin or other alkylene oxides, or styrene oxide or an epoxide such as glycidyl ether, to glycol, glycerol, trimethylolpropane, pentaerythritol, sorbitol, dextrose, sucrose or other polyhydric alcohols, diethanol amine, triethanol amine or other alkanol amines, or bisphenol A, a phenol-formaldehyde condensate or other polyhydric phenols, or ethylene diamine, diaminophenylmethane or other amines, and polyether polyols such as tetrahydrofuran polymers. These polyether polyols may be used in combination of two or more different types. A preferred polyether polyol is a polyether polyol having a molecular weight of from 300 to 10,000 per hydroxyl group. Particularly preferred is a polyether polyol having a molecular weight of from 600 to 5,000 per hydroxyl group and having from 2 to 8 hydroxyl groups. In the present invention, it is particularly preferred to employ a polyether polyol having a molecular weight of from 800 to 1,500 per hydroxyl group and from 2 to 6 hydroxyl groups and containing an oxypropylene group as the main component. A condensed resin dispersion having such a relatively low molecular weight polyether polyol as the base, used to be poor in the dispersion stability.

The polyether (a) as the starting material for the isocyanate modified polyether (b) is a polyether compound having at least one active hydrogen group reactive with an isocyanate, such as a hydroxyl group, a primary amino group, a secondary amino group, etc. Particularly preferred is a polyether compound having from 2 to 8 active hydrogen groups. As the active hydrogen group, an alcoholic hydroxyl group is preferred. However, a polyether having both an alcoholic hydroxyl group and an amino group may be used. As a particularly preferred polyether (a), the same polyether polyol as the above-mentioned polyether polyol (c) may be used, although even a higher molecular weight can be used.

The polyether (a) containing an amino group, may be an aminated polyether obtained by substituting at least a part of hydroxyl groups of a polyether polyol or a polyether monool by a primary or secondary amino group or by an organic residue having such an amino group. Particularly preferred is a polyether polyol obtained by substituting a part of hydroxyl groups of a polyether polyol by an amino group (i.e. a partially aminated polyether polyol). Further, as the polyether (a), a mixture of such a polyether with a polyether polyol, may be used. As an aminated polyether polyol, the one obtainable by aminating a polyether polyol with ammonia, or the one obtainable by hydrolyzing an isocyanate group-containing prepolymer obtained by reacting a polyether polyol with a polyisocyanate, may be employed. The former is particularly preferred. Such a partially aminated polyether polyol is preferably such that the total number of amino groups and hydroxyl groups is from 2 to 8, and the proportion of the number of the amino groups to such a total number is at most 50%, particularly from 0.1 to 20%. Further, the molecular weight per active hydrogen group is preferably at least 300, particularly at least 600.

The polyether (a) as the starting material for the isocyanate modified polyether (b) preferably has a molecular weight per active hydrogen group higher by at least 100, more preferably by at least 300, than that of the polyether polyol (c). For example, when a triol having a molecular weight of 3,000 is used as the polyether polyol (c), a polyether triol having a molecular weight of at least 3,900, or a polyether diol having a molecular weight at least 2,600 is preferably employed. When the molecular weight per active hydrogen group of the polyether polyol (c) is high (for example, when the molecular weight per active hydrogen is 2,000 or higher), the molecular weight per active hydrogen group of the polyether (a) is preferably at least 1.2 times, more preferably at least 1.5 times. The molecular weight per active hydrogen group of this polyether (a) varies depending upon the molecular weight of the polyether polyol (c) to be used, but is preferably from 1,500 to 20,000.

As a starting material for the isocyanate-modified polyether (b), a low molecular weight compound having at least one active hydrogen group reactive with an isocyanate group, such as an amino group or a hydroxyl group, may be used in combination with the above polyether (a). Preferably, a polyol, polyamine or alkanol amine having a molecular weight of not higher than 500, may be mentioned. Particularly preferred is a polyamine having from 2 to 4 amino groups.

As the organic polyisocyanate as the starting material for the isocyanate-modified polyether (b), aromatic, aliphatic, alicyclic and heterocyclic compounds having at least two isocyanate groups, may be used alone or in combination. It is particularly preferred to use an aromatic polyisocyanate compound. Specific examples of the polyisocyanate compound includes tolylene diisocyanate (TDI), diphenylmethane isocyanate (MDI), polymethylenepolyphenyl isocyanate, xylylene diisocyanate, naphthalene diisocyanate, hexamethylene diisocyanate and isopholone diisocyanate. The polyisocyanate compound may be used also in the form of a modified polyisocyanate compound which is modified by various methods or with various compounds.

Further, instead of the organic polyisocyanate or as a part thereof, a blocked isocyanate obtained by blocking a part of isocyanate groups of the organic polyisocyanate with various blocking agents, may be used. Such a blocked isocyanate has at least one free isocyanate group. However, the blocked isocyanate groups may be less than 1 per molecule on average. The blocking agent may be used separately from the organic polyisocyanate. For example, the blocking agent may be reacted at the same time as the polyisocyanate (a) is reacted with the organic polyisocyanate. Otherwise, the blocking agent may be reacted to an isocyanate group-containing prepolymer obtained by reacting the polyether (a) and the organic polyisocyanate. As the blocking agent, various compounds may be employed, including, for example, oximes such as methyl ethyl ketone oxime, caprolactams, alcohols, phenols and active methylene compounds such as acetoacetates.

In the presence of the above described isocyanate-modified polyether (b), the starting materials for the condensed resin are reacted to precipitate fine particles of the condensed resin. At that time, water or a solvent may be present together with the isocyanate-modified polyether (b). As such a solvent, an organic solvent having a relatively low boiling point is preferred. It is preferred to employ an organic solvent having a boiling point of not higher than 200° C. As such an organic solvent, an organic solvent having an active hydrogen group, such as an alcohol may be used. However, in a case where the isocyanate-modified polyether (b) has a blocked isocyanate group, it is preferred to use an organic solvent having no active hydrogen group. As described hereinafter, water is introduced to the reaction system as a solvent for the aldehyde, in many cases. However, it may be added for a separate purpose. Such water or an organic solvent is removed before or after the addition of the polyether polyol (c), as described hereinafter.

As such an organic solvent, a hydrocarbon such as pentane, hexane, cyclohexane, benzene, toluene or xylene, an alcohol such as methanol, ethanol, isopropanol or cyclohexanol, an ether such as isopropyl ether or tetrahydrofuran, a ketone such as acetone or methyl ethyl ketone, an ester such as ethyl acetate or butyl acetate, a halogenated hydrocarbon such as dichloroethane or trichlorotrifluoroethane, nitrobenzene, acetonitrile, or dimethylformamide may for example be employed.

There is no particular restriction as to the proportion of the isocyanate-modified polyether (b) to be used. However, it is preferably used in an amount of from 0.01 to 50% by weight, particularly from 0.1 to 30% by weight, relative to the resulting condensed resin. On the other hand, the proportion of the isocyanate-modified polyether (b) to the subsequently added polyether polyol (c) is preferably at most the equal amount by weight, although it is not particularly limited. Namely, it is preferably from 0.1 to 50 parts by weight, particularly from 0.5 to 20 parts by weight, relative to 100 parts by weight of the polyether polyol (c).

A part or whole of the polyether polyol (c) as the base polyol may be present in the reaction system together with the above water or organic solvent. Otherwise, it is possible to form fine particles of the condensed resin in a reaction system wherein the isocyanate-modified polyether (b) and the polyether polyol (c) are present in the absence of water or an organic solvent. When the polyether polyol (c) being the base polyol is present as such a dispersing medium, the proportion of the isocyanate-modified polyether (b) to the polyether polyol (c) is not particularly limited, because the polyether polyol (c) may be added after the formation of the fine particles of the condensed resin. In a case where the entire amount of the polyether polyol (c) to be used, is present in the reaction system from the beginning, the proportion of the isocyanate-modified polyether (b) to the polyether polyol (c) is preferably at most the equal amount by weight. Namely, it is preferably from 0.1 to 50 parts by weight, particularly from 0.5 to 20 parts by weight, relative to 100 parts by weight of the polyether polyol (c).

One of the starting materials for the condensed resin of the present invention is an aldehyde. As the aldehyde, aliphatic, alicyclic, aromatic, heterocyclic aldehyde compounds, other aldehydes, condensates thereof or derivatives such as compounds capable of generating aldehydes, may be employed alone or in combination. Preferred aldehydes are lower aliphatic aldehydes. Particularly preferred are aliphatic aldehydes having at most 4 carbon atoms and their derivatives, including, for example, formaldehyde, acetoaldehyde, propionaldehyde, butylaldehyde, isobutylaldehyde, paraformaldehyde and paraacetaldehyde. Most preferred is formaldehyde. Such an aldehyde may be used as dissolved in a solvent. A particularly preferred solvent is water. However, the solvent is not limited to water. In the present invention, it is particularly preferred to employ an aqueous solution of formaldehyde i.e. formalin.

Another starting material for the condensed resin is a compound capable of being condensed with the aldehyde to form a solid condensed resin (hereinafter sometimes referred to as an aldehyde-condensable compound). This compound is required basically to have two sites reactive with the aldehyde (hereinafter referred to as reactive sites). A typical reactive site is a carbon atom of an aromatic compound to which hydrogen is bonded, or a nitrogen atom in an amino group or in an amido group to which hydrogen is bonded. As the reactive site in an organic compound, the o- or p-position of the aromatic compound to which a hydroxyl group or an amino group is bonded, is preferred. It is required to have at least two such reactive sites. Namely, a compound having no substituent at such a site is suitable. As a compound having amino groups or amido groups, a polyamine compound having at least two such groups is basically suitable. Accordingly, as the aldehyde-condensable compound, an aromatic compound such as a phenol or an aromatic amine, urea, a guanidine compound or other polyamine compound is preferred. These compounds capable of reacting with aldehydes, may be used in combination as a mixture of two or more different kinds. Further, a compound having only one reactive site may be used in combination therewith.

Among the aromatic compounds, the phenols include, for example, phenol, cresol, xylenol, p-alkylphenol, p-phenylphenol, bisphenol A and resorcinol. Particularly preferred is phenol. The aromatic amines include, for example, aniline, diaminobenzene, p-alkylaniline, n-substituted alkylaniline, diphenylamine and diaminodiphenylmethane. Like phenol compounds, these aromatic amines may be used alone or in combination as a mixture of two or more different kinds. The amino group or the amido group in an aromatic amine is a reactive site itself. Therefore, such an aromatic amine may be regarded as a kind of the following diamine compounds, and the number of the reactive sites of the aromatic amine other than the amine group or the amido group may be only one. A particularly preferred aromatic amine is aniline. The aromatic compound is not limited to the above-mentioned compounds. For example, an aromatic hydrocarbon such as benzene or xylene, or other compounds may also be employed. Further, a phenol and an aromatic amine may be used in combination. Otherwise, at least one of them is further combined with another aromatic compound.

As the polyamine compound, a compound having basically at least two amino groups or amido groups, especially a compound having at least two amino groups, is preferred. For example, ureas such as urea, thiourea and N-substituted urea, melamine compounds such as melamine and N-alkyl-substituted melamine, S-triadines having at least two amino groups represented by a guanamine compound such as benzoguanamine or acetoguanamine and guanidines such as guanidine, guanidine hydrochloride, aminoguanidine hydrochloride and dicyandiamide. Among them, particularly preferred are urea, melamine and benzoguanamine. These polyamine compounds may be used in combination as a mixture of two or more. For example, they may be used in a combination of urea-thiourea, urea-melamine, urea-benzoguanamine, urea-melamine-benzoguanamine or melamine-dicyandiamide.

Further, the above-mentioned polyamine compound and the above-mentioned aromatic compound may be used in combination. As such a combination, a combination of phenol-urea, phenol-melamine, aniline-urea, aniline-melamine, phenol-aniline-melamine, phenol-urea-melamine or the like may be mentioned.

In addition to those mentioned above, known ketone compounds useful as starting materials for ketone resins may also be used as the compound condensable with an aldehyde. Further, the above described compound having at least two sites reactive with the aldehyde, may be used in combination with a compound having only one reactive site or with a compound having at least two active reactive sites although it is not an aldehyde-condensable compound itself, such as a dialkanolamine, a monoalkanolamine or an aliphatic amine.

Further, in the present invention, it is possible to employ an aldehyde-condensable compound and a precondensate of an aldehyde such as dimethylolurea, hexamethylolmelamine or hexamethoxymethylmelamine, as the starting materials.

There is no particular restriction as to the proportions of the aldehyde-condensable compound and the aldehyde for the reaction to form condensed resin particles, so long as they are within the range of the proportions theoretically capable of forming the condensed resin. An unreacted aldehyde-condensable compound may remain as contained in the formed dispersion, so long as the amount is not excessive. Because, the unreacted aldehyde can be removed at the time of replacing the dispersion medium. The aldehyde is used preferably in an amount of from 5 to 500 parts by weight, particularly from 10 to 100 parts by weight, per 100 parts by weight of the aldehyde-condensable compound.

The condensed resin formed by this reaction is considered to be similar or the same as a cured product of a conventional condensed thermosetting resin such as conventional phenol resin, urea resin or melamine resin, and the reaction for its formation is also believed to be similar. For example, in a case where formaldehyde is used as the aldehyde, the aldehyde-condensable compound and formaldehyde undergoes addition condensation at the initial stage of the reaction, to form various methylol group-containing compounds. The above-mentioned poly condensate as one of the starting materials of the present invention, corresponds to the methylol-addition compound at this stage. Thereafter, the methylol group-containing compound undergoes dehydration condensation, whereby the methylol groups are converted to methylene groups, and the condensation takes places to form a three dimensionally cross-linked solvent insoluble condensed resin. In the present invention, it is necessary to substantially complete the condensation reaction. Whether or not the cross linking has been adequately completed can be judged by confirming that the methylol groups formed at the initial stage of the reaction have been converted to methylene groups. The particle size of the adequately cross-linked condensed resin particles of the present invention is preferably within a range of from 0.01 to 5 $\mu$m, particularly preferably within a range of from 0.1 to 2 $\mu$m. If the particle size exceeds 5 $\mu$m, the particles tend to set in the polyether polyol (c).

Now, the process for obtaining this condensed resin compound will be described in further detail.

The aldehyde-condensable compound and the aldehyde are reacted at a temperature of from room temperature to an elevated temperature and/or under pressure. It is considered that at a relatively low temperature, an aldehyde-added methylol group-containing compound or a low molecular weight condensate is likely to form, and at a relatively high temperature, methylene cross-linking or dimethylene ether linkage is likely to form due to a dehydration reaction of e.g. methylol groups. Of course, the compound to be formed is not solely dependent on the reaction temperature and varies depending also on the charging ratio of the constituting units, the presence of an additive such as a catalyst or the pH. However, taking only the reaction temperature into consideration, it is preferred to conduct the reaction at a relatively low temperature during the initial stage of the reaction and at a relatively high temperature during the later stage of the reaction. Especially, a relatively high temperature during the later stage of the reaction is necessary, in many cases, for the condensation reaction of hydroxyalkyl groups such as methylol groups to take place. Thus, it is preferred to conduct the reaction at a reaction temperature of not higher than about 80° C. during the initial stage of the reaction and at a temperature higher by 10° C. than the temperature at the initial stage and at least above 60° C. during the later stage. The upper limit of the temperature during the later stage of the reaction is preferably a temperature at which the decomposition of the active hydrogen-containing compound or the side reaction other than the reaction for forming the condensed resin hardly takes place. For example, a temperature of from 80° to 200° C. is preferred.

In order to let the condensation reaction proceed at a relatively low temperature, it is possible to employ an acid such as hydrochloric acid or acetic acid, or a base such as sodium hydroxide or triethylamine, as a catalyst. Further, to improve the stability of the fine condensed resin particles, it is effective to add a small amount of a particle dispersion stabilizer such as a surfactant at the time of the condensation reaction. Further, the reaction may be conducted in the presence of various additives, for example, a curing agent such as hexamethylene tetramine, a dispersion stabilizer and a coloring agent.

It is undesirable that the polyol, etc. used as materials for polyurethane contain an organic solvent or relatively large amount of water. Therefore, also in the present invention, if water or an organic solvent is present in the reaction system, it is necessary to remove such water or organic solvent after completion of the reaction. Usually, such water or organic solvent can be removed under heating or under reduced pressure.

In a case where the polyether polyol (c) is not present or not the entire amount of the polyether polyol (c) is present in the reaction system for forming fine condensed resin particles, the polyether polyol (c) as the base polyol is added after the formation of fine condensed resin particles. The addition of the polyether polyol (c) is conducted before or after the removal of the water or organic solvent. The amount of the polyether polyol (c) to be added, may optionally be changed depending upon the desired concentration of the condensed resin. The amount of the dispersed condensed resin to the polyether polyol (c) in the dispersion of the present invention, is not particularly limited so long as the condensed resin is stably dispersed. However, if it becomes excessive, the dispersion stability tends to be low, and the viscosity tends to be high. It is usually preferred that the content of the fine condensed resin particles to the dispersion of the fine condensed resin particles obtained by adding the polyether polyol (c), is not higher than 80% by weight, particularly preferably not higher than 50% by weight. There is no particular lower limit, but the content is preferably at least 2% by weight, particularly at least 5% by weight, in order to obtain the effects of the dispersion of the present invention for the production of polyurethane.

The condensed resin dispersion of the present invention obtained as described above, is preferably a white or colored translucent or opaque viscous liquid having condensed resin particles having a particle size of from 0.1 to 5 μm dispersed in the polyether polyol (c), and the viscosity varies depending upon the viscosity of the polyether polyol (c) used, the proportion of the condensed resin in the polyether polyol (c), the type of the condensed resin, etc. However, as a starting material for polyurethane, the dispersion preferably has a viscosity of not higher than 50,000 cps at 25° C. Even when the viscosity is higher than this level, it may of course be possible to use such a dispersion, for example, by diluting it with other polyether polyols.

It is believed that in the process of the present invention, a graft reaction of the isocyanate-modified polyether (b) takes place at the time of formation of the condensed resin. Namely, it is believed that urethane bonds or urea bonds in the isocyanate-modified polyether (b), or urethane bonds or urea bonds formed by the reaction of isocyanate groups resulting from deblocking of the blocked isocyanate groups, with other active hydrogen groups of the isocyanate-modified polyether (b) or the starting materials for the condensed resin, effectively serve as graft sites. Further, when an aromatic polyisocyanate is used as the organic polyisocyanate, its aromatic nucleus is believed to function as a graft site. On the other hand, the isocyanate-modified polyether (b) has a polyether chain like the polyether polyol (c) as the base polyol, and thus it has an affinity to the polyether polyol (c). Thus, fine particles of the condensed resin have an affinity to the base polyol, whereby an especially good dispersed state is obtainable. The condensed resin dispersion of the present invention is preferably such that it undergoes no separation for at least one month, particularly at least two months under a stand still condition. However, it is of course not districted to such a period of time.

As described above, the condensed resin in the dispersion of the present invention, is of a sufficiently cross-linked type and accordingly does not substantially have functional groups containing hydroxyl groups such as methylol groups. Accordingly, the hydroxyl value of the dispersion will not substantially be high as compared with the hydroxyl value of the base polyol, etc. used as the dispersion medium and sill be lower than the hydroxyl value of the base polyol in proportion to the content of the condensed resin. Therefore, the hydroxyl groups in the dispersion are preferably not higher than 1.2 times, more preferably equal or lower, than the hydroxyl groups of the base polyol. However, for example in a case where a hydroxyl group-containing organic compound such as a phenol compound is used, the hydroxyl value of the dispersion may sometimes be higher than the hydroxyl value of the base polyol. In the case of a conventional amino resin polycondensate-containing polyol, if the hydroxyl value of the polyol used is higher than the hydroxyl value of the amino resin precondensate, the hydroxyl value of the dispersion polyol will be lower than the hydroxy value of the original polyol. However, if the one having a hydroxyl value as high as at least about 600 such as dimethylol urea or polymethylol melamine is used as a constituting component of the amino resin precondensate and this is combined with a polyol having a low hydroxyl value (i.e. of a high molecular weight) to form a dispersion, the hydroxyl value of the dispersion will be substantially higher than the hydroxyl value of the polyol.

The condensed resin dispersion of the present invention obtained by the process described in the foregoing, is particularly suitable for use as a part or whole of the active hydrogen-containing compound as the main material for the production of polyurethane. Further, the condensed resin dispersion of the present invention containing an active hydrogen-containing compound having a relatively low molecular weight, can be used also as a part or whole of the cross-linking agent as a subsidiary material for polyurethane. The conventional polymer polyol tends to lower the flame retardancy of polyurethane. Whereas, the condensed resin of the present invention improves the flame retardancy of polyurethane. Particularly, the condensed resin dispersion of the present invention wherein a phenol compound, a urea compound, a melamine compound, a guanamine compound or a guanidine compound is used as the main component, is particularly effective for the improvement of the flame retardancy of polyurethane.

As a polyol useful as the basic material for polyurethane, a high molecular weight polyol having a molecular weight of from 300 to 10,000 per hydroxyl group, particularly a polyether polyol having a molecular weight of from 600 to 5,000 per hydroxyl group and having from 2 to 8 hydroxyl groups per molecule, is usually employed. As a starting material for a hard polyurethane foam, a polyol having a lower molecular weight than the above is employed. Accordingly, when the condensed resin dispersion of the present invention is used as a part of the starting material for polyurethane, the above-mentioned conventional high molecular weight polyol may suitably be used as the other polyol to be used in combination.

For the preparation of polyurethane, it is possible to employ, in addition to the basic materials of the polyol and the polyisocyanate, a cross-linking agent composed of an active hydrogen-containing compound having a relatively low molecular weight, which contains at least two active hydrogen atoms, such as a polyhydric alcohol, an alkanol amine or a polyamine. The above-mentioned condensed resin dispersion, particularly the condensed resin dispersion obtainable by using a low molecular weight polyol, may be used as a part or whole of this curing agent. As the polyurethane in the present invention, a polyurethane foam is most suitable. The condensed resin dispersion of the present invention can be used in the same manner as the conventional polymer polyol to obtain a polyurethane foam having excellent properties. For the production of a polyurethane foam, it is usually necessary to use a foaming agent. As the foaming agent, water or a halogenated hydrocarbon such as trichlorofluoromethane, dichlorodifluoromethane, dichlorotrifluoroethane, dichloromonofluoroethane, methylene chloride or the like, may be used. Further, a foam stabilizer is required in many cases for the production of a polyurethane foam. As the foam stabilizer, an organic silicon compound such as a poly(-dialkylsilane) or a polyoxyalkylene chain-containing silane is useful. In some cases, a fluorine surfactant may also be used. A catalyst is usually used for the production of a foamed or non-foamed polyurethane. As such a catalyst, various tertiary amines, other amine compounds or organic tin compounds may be used alone or in combination. Various additives such as a stabilizer, a filler, a reinforcing agent, a coloring agent, a releasing agent, a cross-linking agent, an chain extender and a flame retardant, may be used as other starting materials for foamed or non-foamed polyurethanes.

The other basic material for polyurethane is a polyisocyanate compound. As the polyisocyanate compound, the above-mentioned organic polyisocyanate compounds can be used. There is no particular restriction as to the method for producing polyurethane by using these staring materials. For example, a one shot method, a prepolymer method or a RIM may be employed.

Now, the present invention will be described in further detail with reference to Examples. However, it should be understood that the present invention is by no means restricted by such specific Examples. In these Examples, "parts" means "parts by weight".

The present invention provides a process whereby a condensed resin-dispersed polyether polyol having excellent dispersion stability can be produced. Particularly when the molecular weight per hydroxyl group of the polyether polyol as the base is relatively small, the dispersion stability of the fine condensed resin particles used to be inadequate according to conventional processes. Whereas, according to the process of the present invention, even with such a base polyol, it is possible to obtain a condensed resin-dispersed polyether polyol having excellent dispersion stability. For example, it is possible to obtain a condensed resin-dispersed polyether polyol having excellent dispersion stability containing as the base a polyether polyol having a molecular weight of about 3,000, which is most widely employed as a starting material for soft polyurethane foams.

PREPARATION OF ISOCYANATE-MODIFIED POLYETHERS

1. Preparation of isocyanate-modified polyether (A)

In a 10 l pressure reactor, 6,000 parts by weight of polyoxypropyleneoxyethylene polyol having a molecular weight of 6,000, 174 parts by weight of tolylene diisocyanate, 87 parts by weight of methyl ethyl ketone oxime and 0.5 part by weight of triethylamine were reacted under stirring using glycerol as an initiator, at 40° C. for 2 hours and further at 80° C. for 6 hours. After completion of the reaction, 60 parts by weight of ethyldiamine was added thereto, and the mixture was reacted at 120° C. for 2 hours to obtain isocyanate-modified polyether (A).

The viscosity was 7,000 cp (25° C.).

2. Preparation of isocyanate-modified polyether (B)

In a 10 l pressure reactor, 5,000 parts by weight of an aminated polyether polyol obtained by aminating a part of polyoxypropyleneoxyethylene polyol having a molecular weight of 5,000 (amination degree: about 34%), 174 parts by weight of tolylene diisocyanate, 87 parts by weight of methyl ethyl ketone oxime and 0.5 part by weight of triethylamine were reacted under stirring using glycerol as an initiator, at 30° C. for 3 hours to obtain isocyanate-modified polyether (B).

The viscosity was 5,000 cp (25° C.).

3. Preparation of isocyanate-modified polyether (C)

Using glycerol as an initiator, 34.8 parts by weight of tolylene diisocyanate was added and reacted to a mixture comprising 1,400 parts by weight of polyoxypropyleneoxyethylene triol having a molecular weight of 7,000 and an ethylene oxide content of 20% and 6 parts by weight of ethylenediamine, to obtain isocyanate-modified polyether (C) having a theoretical molecular weight of about 14,400 (hydroxyl value: 11.7) and containing urea groups.

EXAMPLE 1

Into a 5 l pressure reactor, 240 parts by weight of the isocyanate-modified polyether (A), 600 parts by weight of melamine, 700 parts by weight of a 35% formaline aqueous solution and 200 parts by weight of water were charged and reacted under stirring at 100° C. for 4 hours. Then, using glycerol as an initiator, 2,160 parts by weight of polyoxypropylene polyol having a molecular weight of 5,000 was added thereto under stirring. Then, water was removed under reduced pressure to obtain a white viscous polyol.

The viscosity was 4,000 cp. The solid particles in this polyol were found to be stably dispersed without separating from the polyol for a period of at least 6 months.

EXAMPLE 2

Into a 5 l pressure reactor, 120 parts by weight of the isocyanate-modified polyether (B), 400 parts by weight of melamine, 200 parts by weight of dicyandiamide and 1,000 parts by weight of a 35% formaline aqueous solution were charged and reacted under stirring at 100° C. for 4 hours. Then, using glycerol as an initiator, 2,280 parts by weight of polyoxypropylene polyol having a molecular weight of 3,000 was added thereto under stirring. Then, water was removed under reduced pressure to obtain a white viscous polyol dispersion.

The viscosity was 2,800 cp. The solid particles in this polyol were found to be stably dispersed without separating from the polyol for a period of at least 6 months.

EXAMPLE 3

Into a 5 l pressure reactor, 240 parts by weight of the isocyanate-modified polyether (A), 200 parts by weight of urea, 400 parts by weight of melamine and 900 parts by weight of a 35% formaline aqueous solution were charged, and reacted under stirring at 100° C. for 4 hours. Then, using glycerol as an initiator, 2,160 parts by weight of polyoxypropyleneoxyethylene polyol having a molecular weight of 3,000 was added thereto under stirring. Then, water was removed under reduced pressure to obtain a white viscous polyol dispersion. The viscosity was 3,000 cp.

The solid particles of this polyol were found to be stably dispersed without separating from the polyol for a period of at least 6 months.

EXAMPLE 4

Into a 5 l pressure reactor, 150 parts by weight of the isocyanate-modified polyether (C), 600 parts by weight of urea, 300 parts by weight of benzoguanamine and 1,500 parts by weight of a 35% formaline aqueous solution were charged, and reacted at 80° C. for 2 hours and at 100° C. for 2 hours to obtain a bluish white viscous emulsion having particles precipitated. To this emulsion, 1,950 parts by weight of polyoxypropyleneethylene triol having a molecular weight of 5,000 and an ethylene oxide content of 15% was added using glycerol as an initiator. Then, water was removed under reduced pressure at 140° C. to obtain a bluish white emulsified polyol dispersion.

EXAMPLE 5

In a 5 l pressure reactor, 2,160 parts by weight of polyoxypropyleneoxyethylene polyol having a molecular weight 5,000, 240 parts by weight of the isocyanate-modified polyether (A), 600 parts by weight of melamine and 700 parts by weight of a 35% formaline aqueous solution were reacted using glycerol as an initiator under stirring at 100° C. for 4 hours. Then, water was removed under reduced pressure to obtain a white viscous polyol dispersion. The viscosity was 4,000 cp. The solid particles in this polyol were found to be stably dispersed without separating from the polyol for a period of at least 6 months.

EXAMPLE 6

In a 5 l pressure reactor, 2,280 parts by weight of polyoxypropyleneoxyethylene polyol having a molecular weight of 3,000, 120 parts by weight of the isocyanate-modified polyether (B), 400 parts by weight of melamine, 200 parts by weight of dicyandiamide and 1,000 parts by weight of a 35% formaline aqueous solution were reacted using glycerol as an initiator under stirring at 100° C. for 4 hours. Then, water was removed under reduced pressure to obtain white viscous polyol dispersion.

The viscosity was 2,800 cp. The solid particles in this polyol were found to be stably dispersed without separating from the polyol for a period of at least 6 months.

EXAMPLE 7

In a 5 l pressure reactor, 2,160 parts by weight of polyoxypropyleneoxyethylene polyol having a molecular weight of 3,000, 240 parts by weight of the isocyanate-modified polyether (A), 200 parts by weight of urea, 400 parts by weight of melamine and 900 parts by weight of a 35% of formaline aqueous solution were reacted using glycerol as an initiator under stirring at 100° C. for 4 hours. Then, water was removed under reduced pressure to obtain a white viscous polyol dispersion.

The viscosity was 3,000 cp. The solid particles in this polyol were found to be stably dispersed without separating from the polyol for a period of at least 6 months.

COMPARATIVE EXAMPLE 1

The synthesis was conducted under the same conditions as in Example 1 except that instead of the isocyanate-modified polyether (A) in Example 1, 2,400 parts by weight of polyoxypropylene polyol having a molecular weight of 5,000 was used under initiation with glycerol. When the stirring was stopped, the synthesized solid particles underwent separation from the polyol and settled to form a lower layer.

COMPARATIVE EXAMPLE 2

The synthesis was conducted under the same conditions as in Example 2 except that instead of the isocyanate-modified polyether (B) in Example 2, polyoxypropylene polyol having a molecular weight of 3,000 was used under initiation with glycerol. The synthesized was a bulky solid separated from the polyol.

COMPARATIVE EXAMPLE 3

The synthesis was conducted under the same conditions as in Example 3 except that instead of the isocyanate-modified polyether (A) in Example 3, polyoxypropyleneoxy polyol having a molecular weight of 3,000 was used under initiation with glycerol. The synthesized was a bulky solid separated from the polyol.

COMPARATIVE EXAMPLE 4

The synthesis was conducted under the same conditions as in Example 1 except that instead of the isocyanate-modified polyether (A) in Example 1, 2,400 parts by weight of polyoxypropyleneoxyethylene polyol having a molecular weight of 5,000 was used under initiation of glycerol as the base polyol, to obtain a white viscous polyol dispersion. Next day, the solid particles were found to be separated from the polyol and settled to form a lower layer.

COMPARATIVE EXAMPLE 5

The synthesis was conducted under the same conditions as in Example 2 except that instead of the isocyanate-modified polyether (B) in Example 2, polyoxypropylene polyol having a molecular weight of 3,000 was used under initiation with glycerol. The synthesized was a bulky solid separated from the polyol.

COMPARATIVE EXAMPLE 6

The synthesis was conducted under the same conditions as in Example 3 except that instead of the isocyanate-modified polyether (A) in Example 3, polyoxypropyleneoxyethylene polyol having a molecular weight of 3,000 was used under initiation with glycerol. The synthesized was a bulky solid separated from the polyol.

That which is claimed is:

1. A condensed resin dispersion having fine particles of a particle size ranging from 0.01 to 5 μm of a condensed resin dispersion stably in a polyether polyol (c), said condensed resin being the reaction product of an aldehyde and a compound condensable with the aldehyde, or a precondensate of these reactants, wherein the fine particles of the condensed resin are fine condensed resin particles formed by said reaction and precipitation conducted in an isocyanate-modified liquid polyether (b) which is (i) an isocyanate-modified polyether obtained by reacting, with a mixture of a polyether (a) and a low molecular weight polyamine, less than the equivalent amount of an organic polyisocyanate or a partially blocked organic polyisocyanate, (ii) an isocyanate-modified polyether obtained by reacting, with a mixture of a polyether (a) and a low molecular weight polyamine and a blocking agent, less than the equivalent amount, based on the total equivalent amount thereof, of an organic polyisocyanate, or (iii) an isocyanate-modified polyether obtained by reacting, with a mixture of a polyether (a) and a low molecular weight polyamine, more than the equivalent amount of an organic polyisocyanate, followed by reaction of the reactive material with a blocking agent.

2. The dispersion according to claim 1, wherein the polyether (a) is a polyether polyol or a partially aminated polyether polyol.

3. The dispersion according to claim 1, wherein the molecular weight per active hydrogen group of the polyether (a) is higher by at least 100 than the molecular weight per hydroxyl group of the polyether polyol (c).

4. The dispersion according to claim 3, wherein the polyether (a) is a compound having a molecular weight per active hydrogen group of from 1,500 to 20,000, which is higher by at least 300 than the molecular weight per hydroxyl group of the following polyether polyol (c), and having a total of from 2 to 8 hydroxyl and/or primary amino groups, and the polyether polyol (c) is a compound having from 2 to 8 hydroxyl groups and having a molecular weight per hydroxyl group of from 600 to 5,000.

5. The dispersion according to claim 1, wherein the content of the fine condensed resin particles in the condensed resin dispersion is from 5 to 80% by weight.

* * * * *